US011762525B2

(12) United States Patent
Vakil et al.

(10) Patent No.: US 11,762,525 B2
(45) Date of Patent: Sep. 19, 2023

(54) ENTERPRISE BRANDING CONFIGURATION PROVISIONING

(71) Applicant: VMware, Inc., Palo Alto, CA (US)

(72) Inventors: Ashka Vakil, Sunnyvale, CA (US); Lilit Div, Foster City, CA (US); Xi Bi, Atlanta, GA (US); Sean Walbran, St. Paul, MN (US); Jeremy DeJiacomo, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 3 days.

(21) Appl. No.: 16/743,215

(22) Filed: Jan. 15, 2020

(65) Prior Publication Data

US 2021/0216190 A1 Jul. 15, 2021

(51) Int. Cl.
*G06F 3/048* (2013.01)
*G06F 3/04812* (2022.01)
*G06F 9/38* (2018.01)
*G06F 16/953* (2019.01)

(52) U.S. Cl.
CPC ........ *G06F 3/04812* (2013.01); *G06F 9/3836* (2013.01); *G06F 16/953* (2019.01)

(58) Field of Classification Search
CPC .. G06F 3/0482; G06F 3/04845; G06F 40/106; G06F 40/186; G06F 3/04847; G06F 3/04817; G06F 3/04842; G06Q 30/0643; G06Q 30/0621
See application file for complete search history.

(56) References Cited

U.S. PATENT DOCUMENTS

| 7,809,582 | B2 * | 10/2010 | Wessling | G06F 9/451 |
| | | | | 705/1.1 |
| 9,142,192 | B2 * | 9/2015 | Hou | G06F 8/34 |
| 9,147,004 | B2 * | 9/2015 | Coursol | G06F 16/958 |
| 9,449,126 | B1 * | 9/2016 | Genoni | G06F 40/106 |
| 9,507,480 | B1 * | 11/2016 | Hui | G06F 3/048 |
| 9,519,624 | B1 * | 12/2016 | Genoni | G06F 3/04845 |
| 9,940,315 | B2 * | 4/2018 | Baldwin | G06F 40/186 |
| 10,181,218 | B1 * | 1/2019 | Goetzinger, Jr. | G06F 3/0486 |
| 10,372,443 | B2 * | 8/2019 | Mills | G06F 8/73 |
| 10,445,113 | B2 * | 10/2019 | Perry | G06F 3/0482 |
| 10,671,357 | B2 * | 6/2020 | Lundeen | G06F 8/38 |
| 2002/0161603 | A1 * | 10/2002 | Gonzales | G06Q 10/10 |
| | | | | 709/205 |
| 2004/0205584 | A1 * | 10/2004 | Pezzanite | G06F 40/154 |
| | | | | 715/205 |
| 2007/0118793 | A1 * | 5/2007 | Arora | G06F 40/166 |
| | | | | 715/234 |

(Continued)

*Primary Examiner* — Steven B Theriault
(74) *Attorney, Agent, or Firm* — Clayton, McKay & Bailey, PC

(57) ABSTRACT

Examples described herein include systems and methods for providing a GUI customization tool for customizing a GUI template. The GUI can provide multiple customization options for altering the appearance of the GUI template. Template previews can be displayed in conjunction with the customization options. The template previews can represent different display platforms, such as a web browser, a desktop application, or a mobile device. The GUI customization tool can receive selections of the customization options. Upon receiving a selection, the GUI customization tool can update the template previews according to the selection made. The template previews can be updated in real time.

20 Claims, 10 Drawing Sheets

(56) References Cited

U.S. PATENT DOCUMENTS

| | | | | |
|---|---|---|---|---|
| 2008/0172372 A1* | 7/2008 | Shacham | G06F 16/958 |
| 2010/0037206 A1* | 2/2010 | Larimore | G06F 9/455 |
| | | | | 718/1 |
| 2012/0011435 A1* | 1/2012 | Koarai | G06F 3/1208 |
| | | | | 715/274 |
| 2012/0072835 A1* | 3/2012 | Gross | G06Q 10/10 |
| | | | | 715/243 |
| 2012/0079375 A1* | 3/2012 | Ogino | G06K 15/1867 |
| | | | | 715/274 |
| 2012/0137227 A1* | 5/2012 | Gerken, III | G06F 8/38 |
| | | | | 715/747 |
| 2012/0317479 A1* | 12/2012 | Safa | G06F 40/166 |
| | | | | 715/256 |
| 2013/0067475 A1* | 3/2013 | Singh | G06F 1/3203 |
| | | | | 718/100 |
| 2013/0067490 A1* | 3/2013 | Singh | G06F 9/461 |
| | | | | 718/100 |
| 2013/0067495 A1* | 3/2013 | Singh | G06F 9/485 |
| | | | | 719/318 |
| 2013/0151963 A1* | 6/2013 | Costenaro | G06F 9/453 |
| | | | | 715/711 |
| 2013/0262986 A1* | 10/2013 | Leblond | G06F 40/194 |
| | | | | 715/236 |
| 2013/0275861 A1* | 10/2013 | Goddard | G06Q 50/265 |
| | | | | 715/234 |
| 2013/0325980 A1* | 12/2013 | Ohayon | H04L 51/066 |
| | | | | 709/206 |
| 2013/0326345 A1* | 12/2013 | Haggart | G06F 3/0486 |
| | | | | 715/255 |
| 2014/0101528 A1* | 4/2014 | Pelleg | G06F 8/38 |
| | | | | 715/234 |
| 2014/0204244 A1* | 7/2014 | Choi | H04N 5/23222 |
| | | | | 348/231.99 |
| 2014/0222553 A1* | 8/2014 | Bowman | G06Q 30/0276 |
| | | | | 705/14.72 |
| 2014/0250419 A1* | 9/2014 | Ivmark | G06F 8/20 |
| 2014/0331124 A1* | 11/2014 | Downs | G06F 40/106 |
| | | | | 715/243 |
| 2015/0020006 A1* | 1/2015 | Kotzer | G06F 16/9535 |
| | | | | 715/762 |
| 2015/0149302 A1* | 5/2015 | Parker | G06Q 30/0276 |
| | | | | 705/14.72 |
| 2015/0288682 A1* | 10/2015 | Bisroev | G16H 40/20 |
| | | | | 713/172 |
| 2016/0217481 A1* | 7/2016 | Pastore | G06Q 30/0203 |
| 2017/0031869 A1* | 2/2017 | Franczyk | G06F 40/154 |
| 2017/0032050 A1* | 2/2017 | Kol | G06F 40/197 |
| 2017/0060812 A1* | 3/2017 | Williams | G06F 40/103 |
| 2017/0103054 A1* | 4/2017 | DiSpezio | G06F 3/0486 |
| 2018/0349107 A1* | 12/2018 | Lundeen | G06F 3/04845 |
| 2019/0065048 A1* | 2/2019 | Lee | G06F 3/0482 |
| 2019/0196766 A1* | 6/2019 | Chiba | H04N 1/0044 |
| 2019/0340230 A1* | 11/2019 | Gall | G06F 8/30 |
| 2020/0050432 A1* | 2/2020 | Das | G06F 3/0482 |
| 2020/0097141 A1* | 3/2020 | Jacobson | G06F 9/44505 |
| 2020/0097161 A1* | 3/2020 | Gonzalez | G06F 3/0482 |
| 2020/0379627 A1* | 12/2020 | Reynolds | G06F 3/04815 |
| 2021/0034225 A1* | 2/2021 | Harazi | G06F 3/04845 |
| 2022/0116438 A1* | 4/2022 | Bradley | H04W 12/037 |

\* cited by examiner

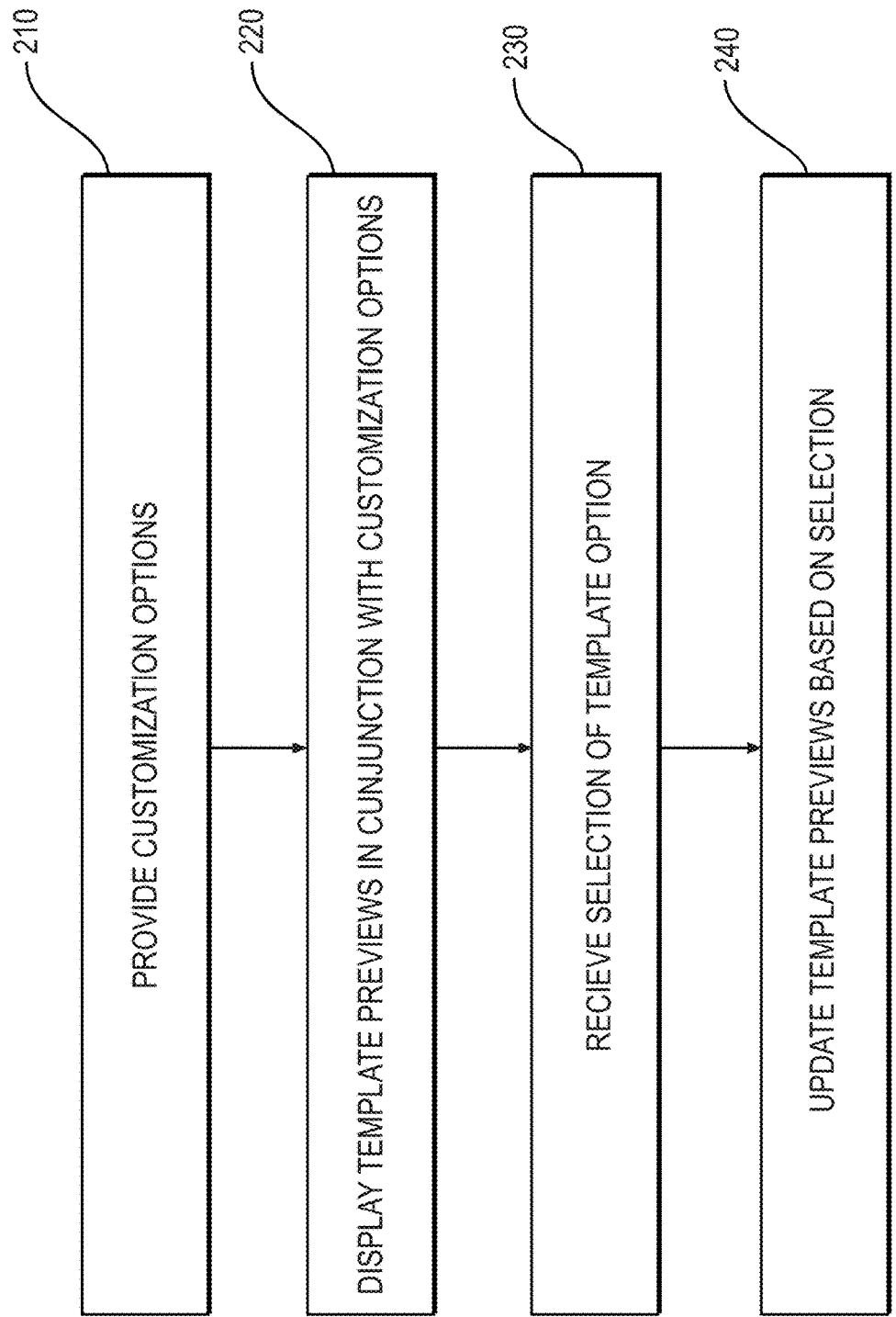

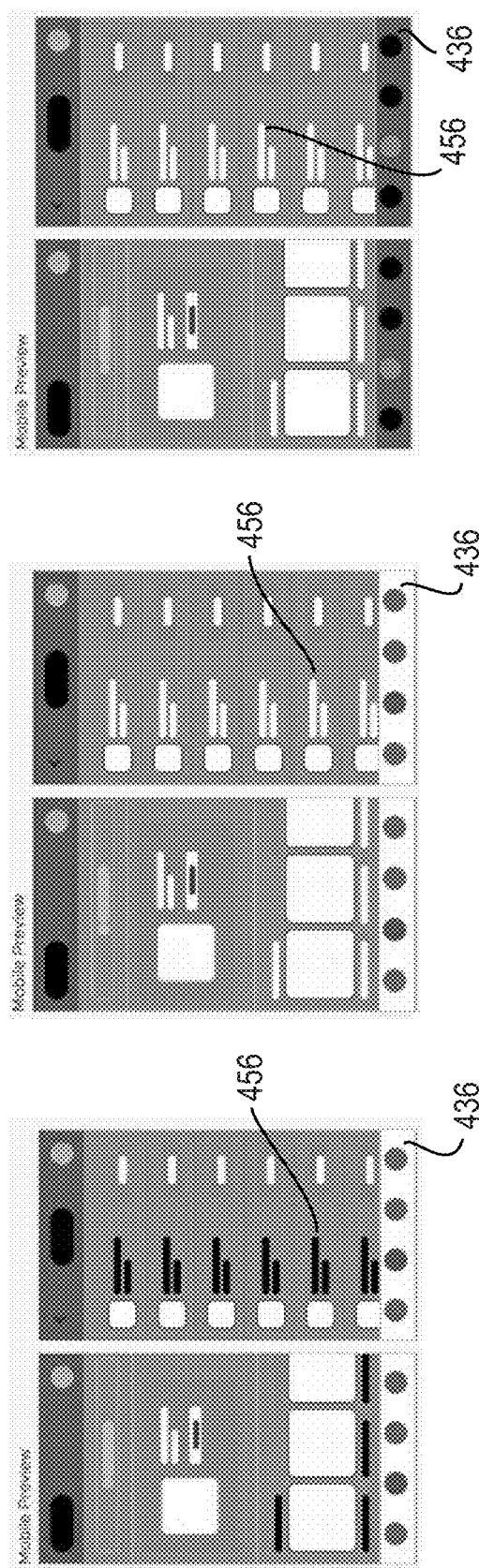
*FIG. 6A*   *FIG. 6B*   *FIG. 6C*

ENTERPRISE BRANDING CONFIGURATION PROVISIONING

BACKGROUND

Applications can usually be executed on different device platforms. For example, the same application can be executed as a desktop application, in a web browser, and on a mobile device. The GUI associated with the application must be modified for each device platform to optimize the user experience. Creating or modifying a GUI template can be time consuming and tedious because current systems and methods do not allow a user to easily view changes made to the template. For example, a user often must effect a change in one page of an interface, and then navigate to another page to view the changes. Navigating back and forth can be frustrating while a user tries to get the right combination of settings.

Additionally, changing the settings of a GUI for a web application on a desktop can negatively affect the appearance of the GUI on a mobile device. Often a user must navigate to an additional page to even view the GUI in a mobile device format. The user must constantly switch between pages while changing settings to get the desired settings for all platforms.

Consistency between all of the different formats is particularly important for white-labelled applications that need to appear to support a tenant's branding. A tenant can be a group within an organization or a customer of the provider of the white-labelled application. It is very tedious to have to separately change and review branding elements of different platforms for every tenant. In the case of a white-labelled application, a mistake in branding consistency across platforms can be costly, confusing, and result in the loss of tenants. Methods of efficient comparative platform review are therefore needed.

As a result, a need exists for a GUI customization template that allows a user to view the effects of changes to a GUI template across multiple platforms at the same time.

SUMMARY

Examples described herein include systems and methods for providing a GUI customization tool for customizing a GUI template. The GUI customization tool can allow an administrative user, such as an information technology ("IT") professional, to make changes to a GUI template pertaining to an organization. In particular, the GUI customization tool can display previews of the GUI template in conjunction with customization options such that a user can view changes made to a GUI template across multiple platforms in real-time. The GUI customization tool can simultaneously present platforms for a web browser, desktop, and mobile. These platforms can simultaneously display to show how tenant-specific customizations appear on the different platforms. The tenant-specific customizations can be retrieved by selecting a tenant on the GUI customization tool, in an example.

In an example, the GUI customization tool can provide customization options in a GUI format. The customization options can alter the appearance of the GUI template. Each customization option can correspond to a component of a GUI template, such a background colors of portions of the template, text colors, logo images, and the like. Customization options can include text boxes, option buttons, drop-down lists, toggles, color selectors, image uploaders, and the like.

In an example, the GUI customization tool can also display template previews in conjunction with the customization options. Each template preview can depict a shell of the GUI template on a different platform, such as a web page, mobile device, or desktop application. In one example, all three platform types can be displayed simultaneously. The template shell can include basic display settings that allow a user to see how the GUI template looks on each platform without any actual content from the GUI. Some customization options can correspond to GUI components on all the templates displayed while others may only correspond to GUI components on one or some templates, but not all.

In an example, the GUI customization tool can receive a selection of one of the customization options. A selection can include any change made to a customization option. The GUI can also update the template previews based on the selection. The update to the template previews can occur in real-time. This can allow the user to immediately view how a selected change affects the GUI on each platform. The user can also toggle changes back and forth to compare without having to be redirected to another page.

In addition, the GUI customization tool can save the selected customization option in a cache, such as a web browser cache. The cache can store changes made to the customization options so that changes made by the user do not affect instances of the GUI being run by other users. For example, the GUI customization tool can save the changes as a configuration file in the cache only accessible to the user's device.

In an example, the GUI customization tool can include a save feature that allows the user to save the changes made to template. Upon receiving user input to save the template, the GUI customization tool can save the changes to a database, for example. Saving the changes to the database can update the GUI when accessed by other users.

In an example, the GUI customization tool can include an option to select or input a tenant identifier ("ID"). A template of the GUI can then be created that is unique to user profiles associated with the tenant ID. When user devices request display settings for the GUI, they can be provided with display settings corresponding to a tenant ID that is associated with a user ID provided by the user device. The GUI customization tool can then present views of the GUI across three different platforms simultaneously.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 2 is a flowchart of an example method for providing an interface for GUI template customization.

FIGS. 6A, 6B, and 6C are example illustrations of selected options displayed in a mobile preview of a GUI for a GUI customization tool.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

A GUI customization tool can be accessed by an administrative user to customize a GUI template. The GUI can provide multiple customization options for altering the appearance of the GUI template. Template previews for multiple different platforms can be simultaneously displayed in conjunction with the customization options. The template previews can represent different display platforms, such as a web browser, a desktop application, and a mobile device. The GUI customization tool can receive selections of the customization options from a user. Upon receiving a selection, the GUI customization tool can update the template previews according to the selection made. The template previews can be updated in real time based on user selections.

Customization option selections can be stored in a local cache, such as a web browser cache. Each time a user changes a customization option, a data file in the local cache can be updated that causes the template previews to reflect the change. A user can have the option to save the changes made to customization options, which can cause the data file to be uploaded to a database or repository corresponding to the GUI.

The GUI customization tool can include an option to select or provide a tenant ID. For example, an administrator user can log into a specific tenant in the GUI to access a GUI branding configurator for that tenant. In another example, GUI templates can be created that are tenant specific. User devices can be provided with different display settings depending on the associated tenant ID. Template previews can be saved and displayed for specific tenants, allowing a user to view the look of tenant-specific selections across the multiple platforms at the same time.

Figure 1:
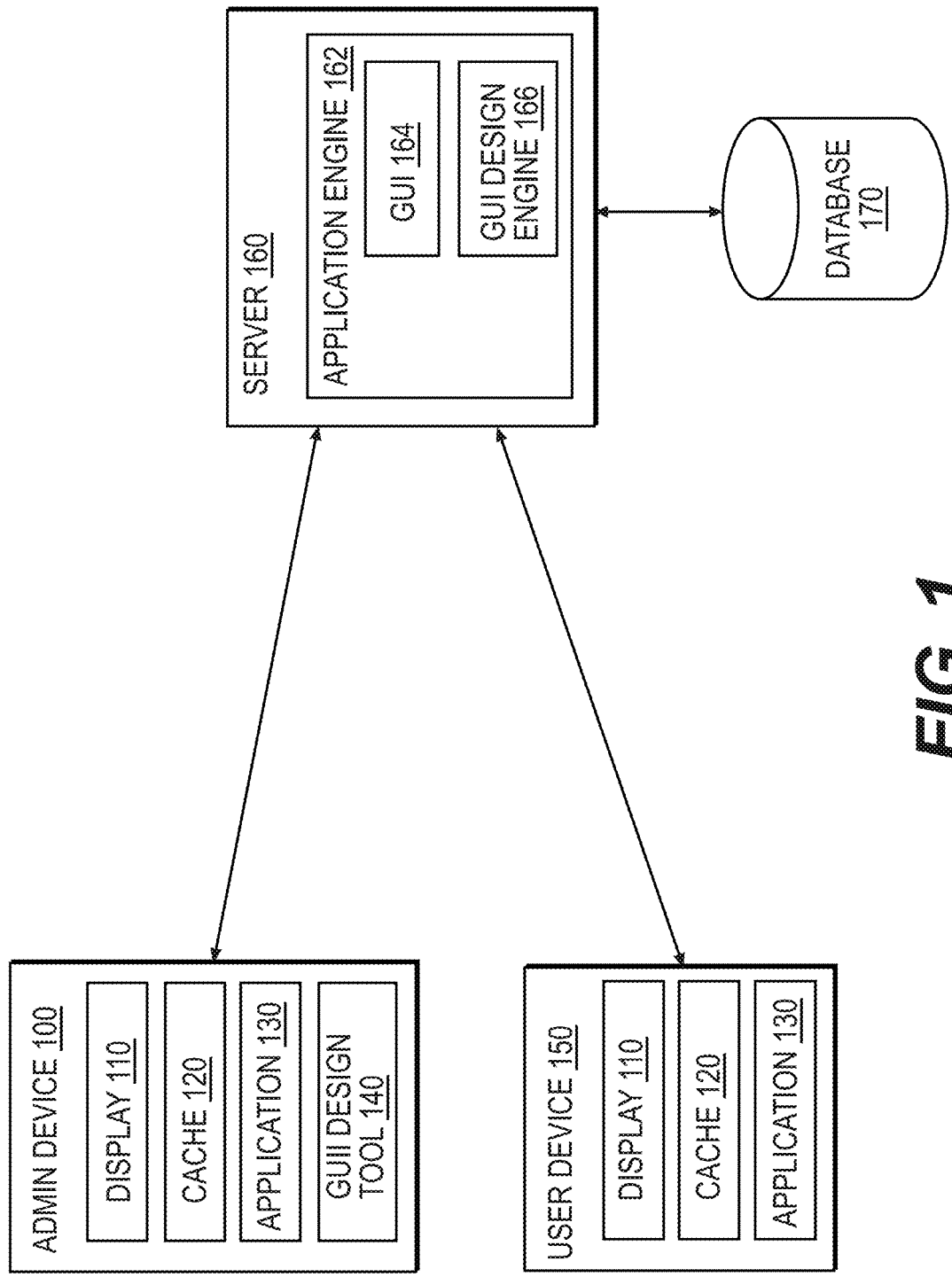
FIG. 1 is an illustration of a system for providing an interface for GUI template customization.
Figure 3A:
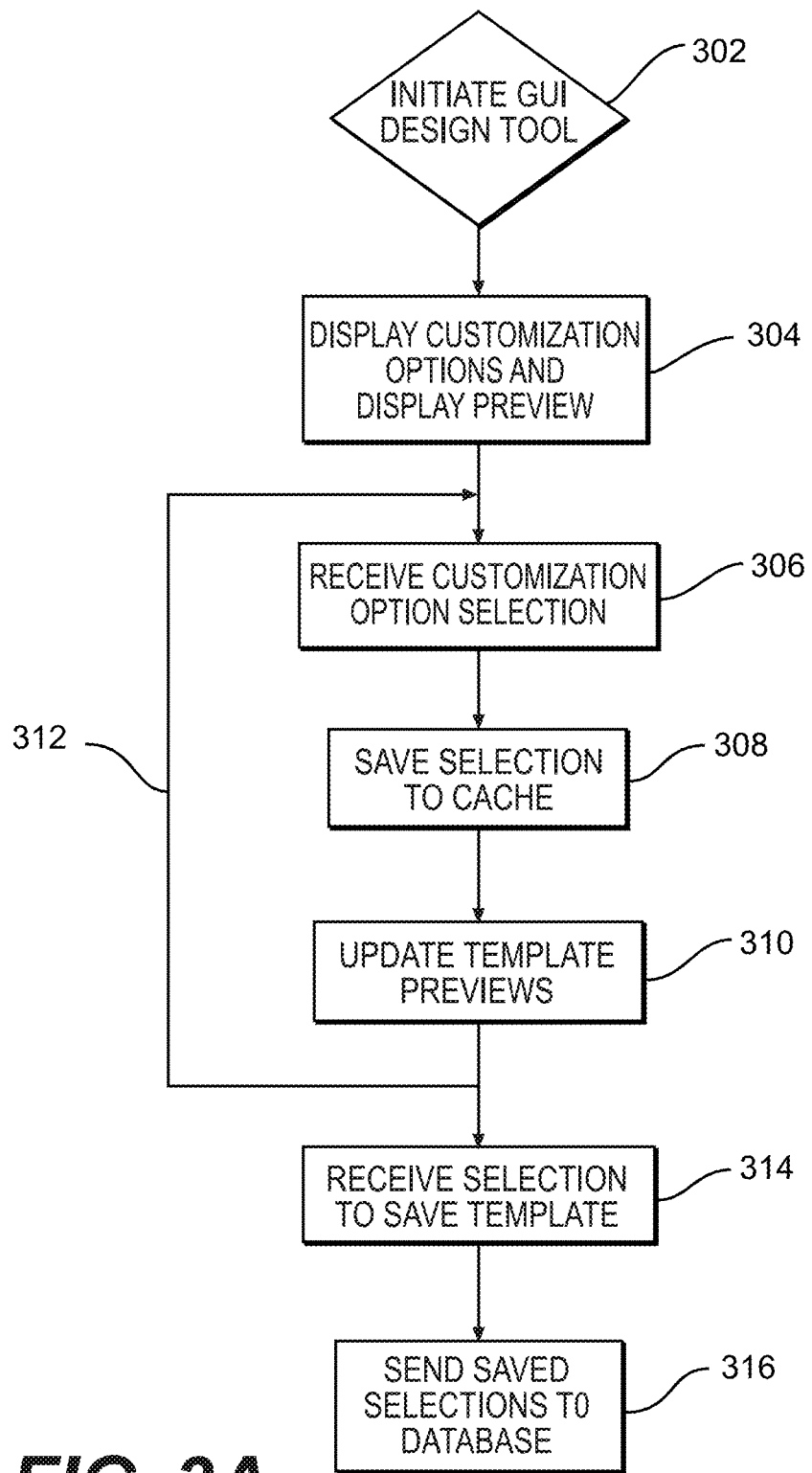
FIG. 3A is a flow chart of an example method for providing an interface for GUI template customization.
Figure 3B:
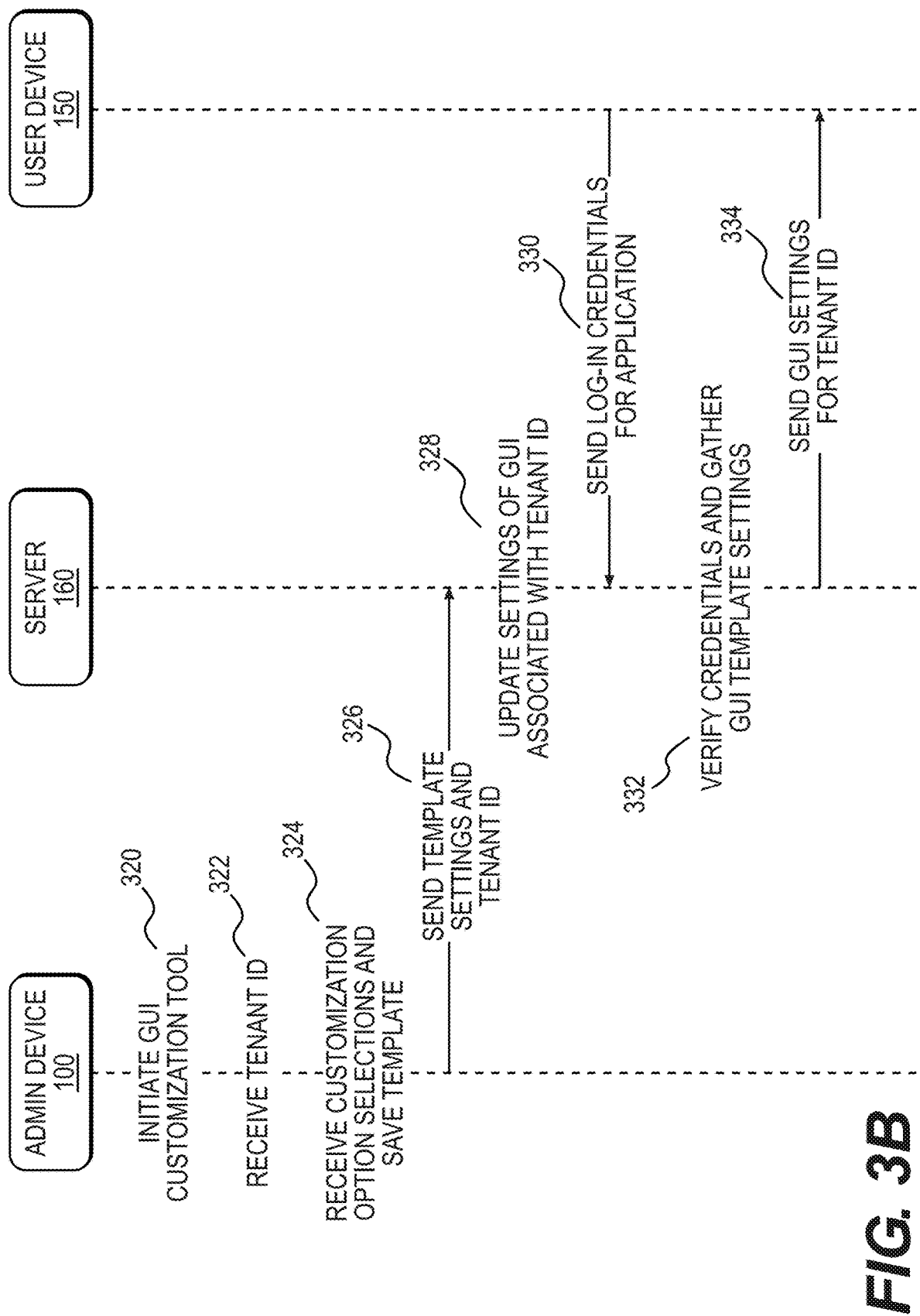
FIG. 3B is a sequence diagram of another example method for providing an interface for customizing a tenant specific GUI template.
Figure 4A:
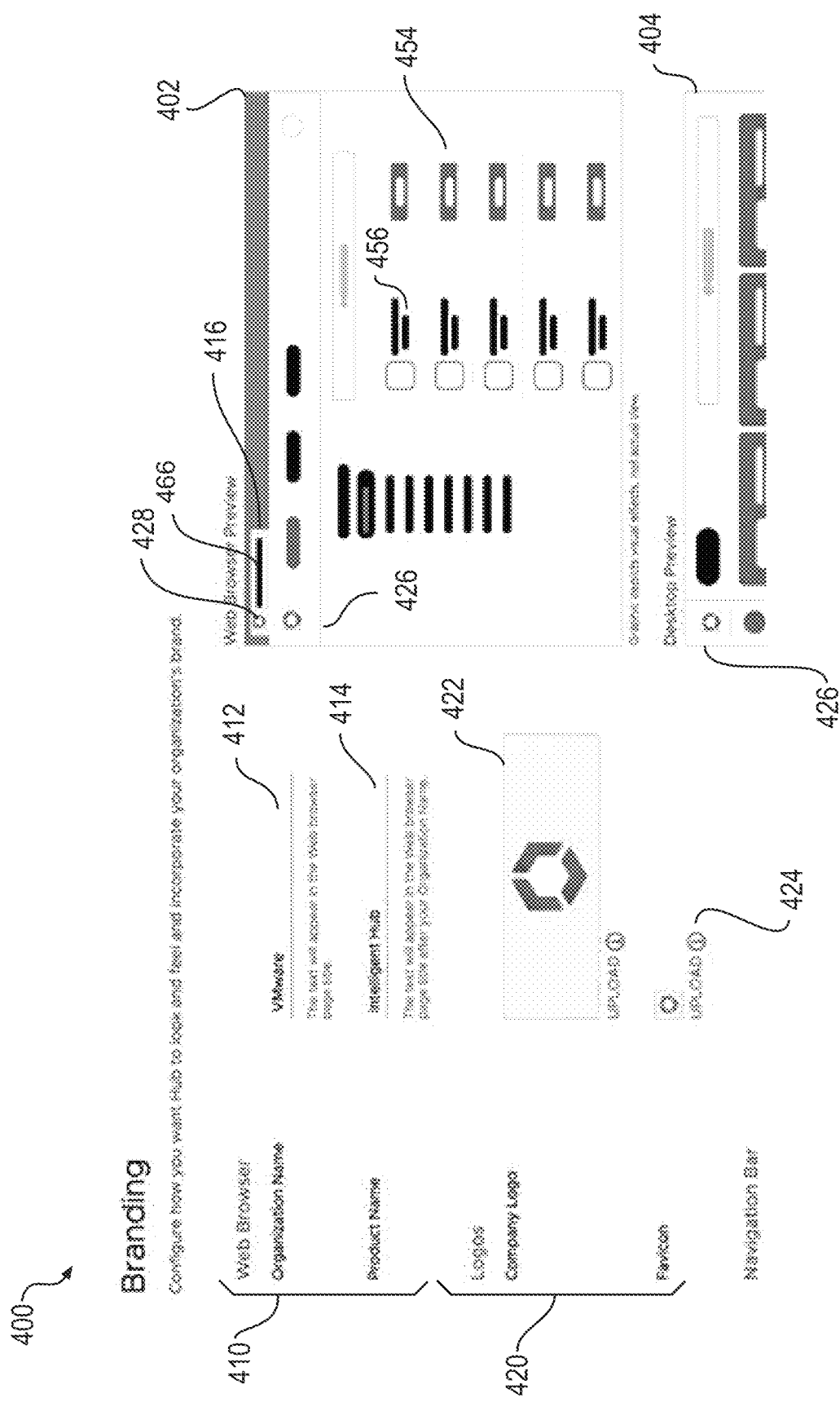
FIGS. 4A, 4B, and 4C are example illustrations of a GUI for a GUI customization tool.
Figure 4B:
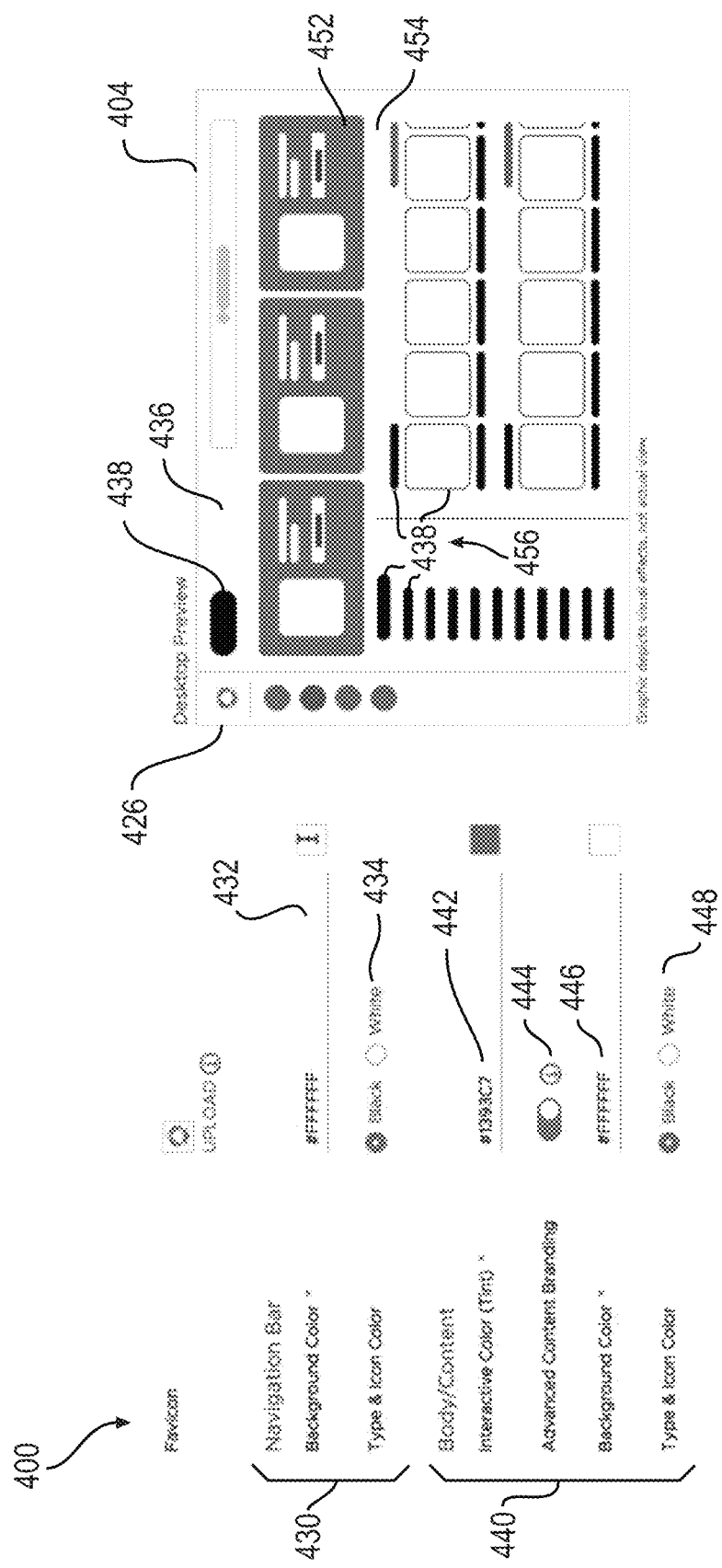
Figure 4C:
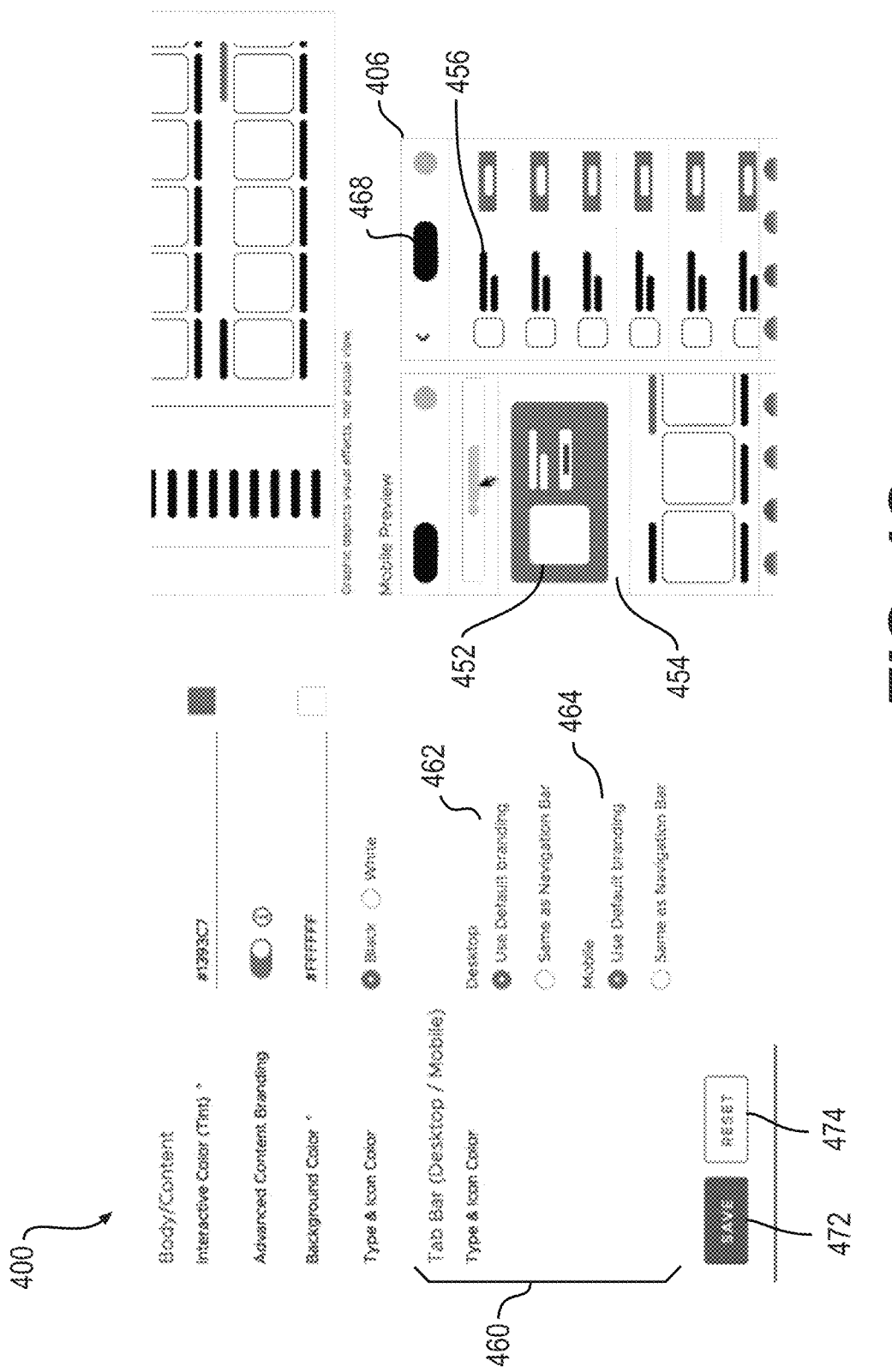
Figure 5:
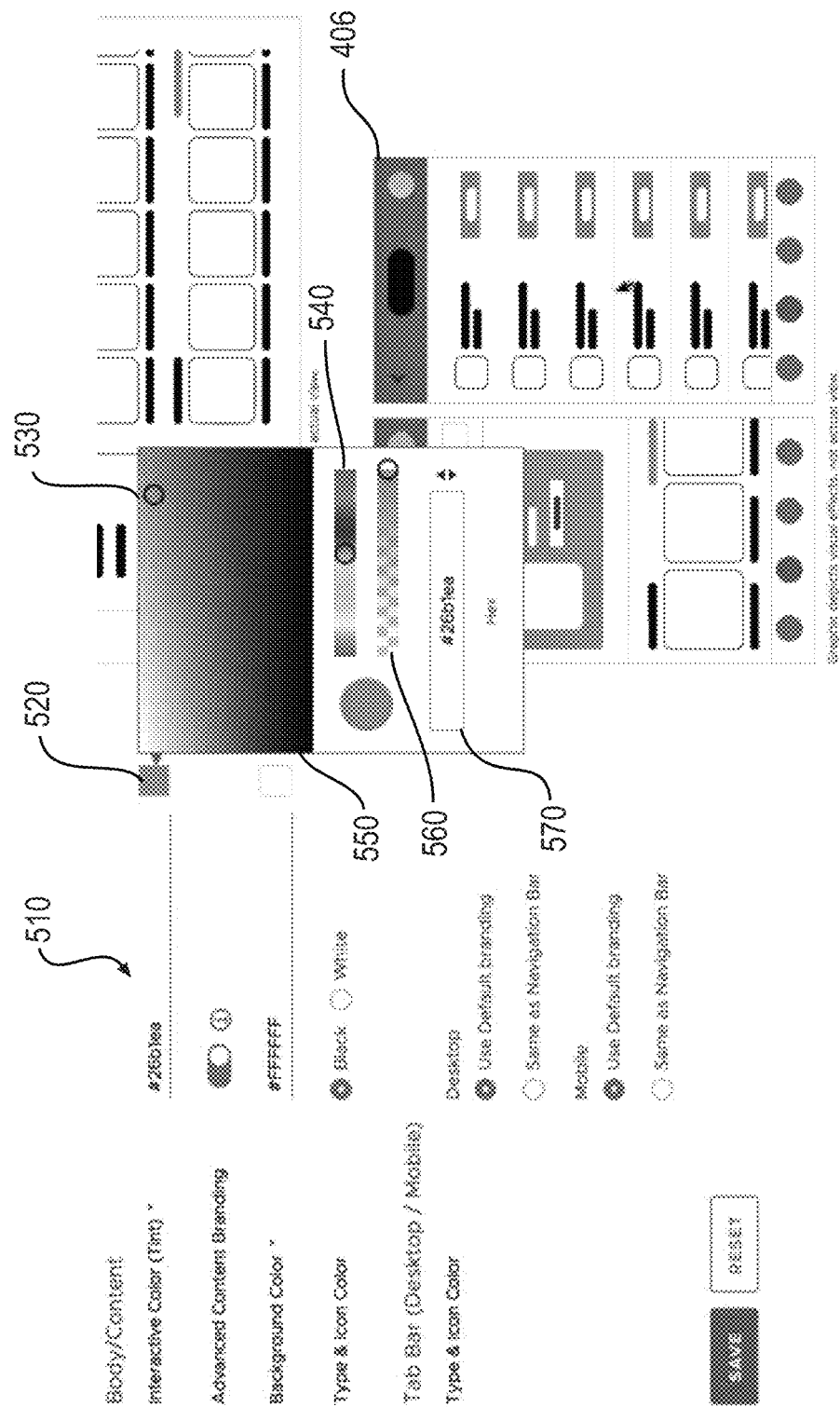
FIG. 5 is an illustration of a color selection customization option in an example GUI customization tool.
Figure 7B:
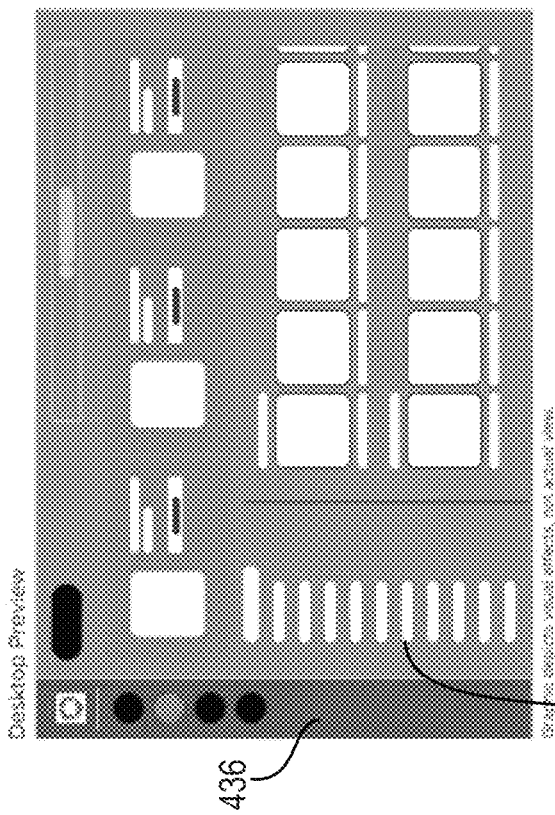
FIGS. 7A and 7B are example illustrations of selected options displayed in a desktop preview of a GUI for a GUI customization tool.
Figure 7A:
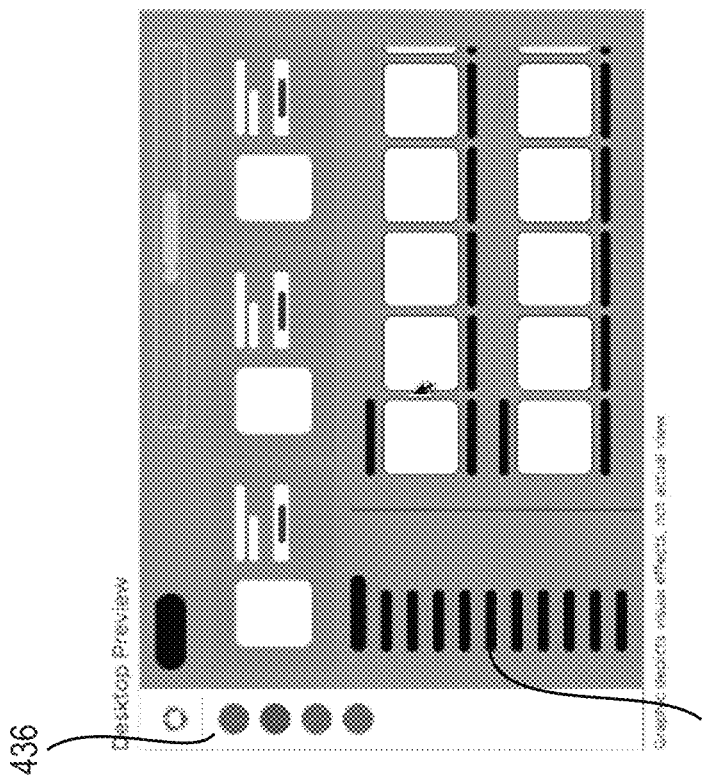

FIG. 1 is an illustration of example system components used for providing an interface for customizing a GUI template. FIG. 2 includes example steps for graphically providing an interface for GUI template customization. FIG. 3A is an example flow chart with stages for a GUI customization tool. FIG. 3B is an example sequence diagram with stages for customizing a tenant specific GUI template. FIGS. 4A-C are an illustration of an exemplary GUI 400 for a GUI customization tool. FIG. 5 illustrates an example of a color selector tool that allows a user to select a color as part of a GUI customization tool. FIGS. 6A-C illustrate examples of how various customization options in a GUI customization tool change a GUI template corresponding to a mobile device. FIGS. 7A and 7B illustrate examples of how various customization options in a GUI customization tool change a GUI template corresponding to a desktop application.

FIG. 1 is an illustration of example system components used for providing an interface for customizing a GUI template. Examples of system components can include admin device 100, user device 150, server 160, and database 170. Admin device 100 and user device 150 can be one or more processor-based devices, such as a personal computer, tablet, or cell phone. Admin device 100 can also be a user device 150, so any reference to user 150 hereinafter can include admin device 100. User device 150 can include display 110, cache 120, and application 130. Admin device 100 can also include GUI customization tool 140. Server 160 can be a single server or a group of servers, including multiple servers implemented virtually across multiple computing platforms. Server 160 can include application engine 162, GUI 164, and GUI customization engine 166. Database 170 can be a data storage device accessible by server 160. In some examples, database 170 can be part of server 160.

Display 110 can be a screen or other display component, such as a tablet screen or computer monitor, that can display GUI 164. Cache 120 can be a local storage component that stores data so that future related data requests can be processed faster. For example, cache 120 can be part of a web browser that stores portions of web pages that a user navigates to. Upon returning to the web page, certain data relating to the web page can be pulled from cache 120 instead of downloading from a server, thus decreasing load time. Application 130 can be an instance of a computer application that displays and manages user interactions with GUI 164. Executing application 130 can cause user device 150 to display GUI 164 on display 110. In some examples, application 130 can be a dedicated app on user device 150. In other examples, application 130 can be a web app accessible via a web browser.

Application engine 162 can include the central components that manage application 130 on user devices. In an example, application engine 162 can provide user devices with instructions for running application 130 in web browser when a user navigates to a Uniform Resource Locator ("URL") associated with application 130. Running application 130 in this example can include displaying GUI 164 in a web browser. In another example, where application 130 is a dedicated app, application 130 can include the necessary components of application engine 162 to run independently, but application 130 queries application engine 162 for settings and other data.

GUI customization tool 140 can be an interface that allows a user to customize a template of GUI 164. GUI customization engine 166 can provide the necessary instructions to admin device 100 that allow admin device 100 to execute GUI customization tool 140. GUI customization tool 140 can include customization options that affect the certain settings of GUI 164. For example, customization options can affect display settings of GUI 164 like colors, icons, graphics, and text. GUI customization tool 140 is described in greater detail later herein.

The GUI customization tool 164 can cause the display 110 to show the display settings for multiple platforms at the same time. For example, the display settings can be shown for a mobile device platform, web platform, and a desktop platform—all simultaneously on a single GUI 164 screen. This can allow a user to ensure consistency of a tenant's brand across multiple platforms at the same time, in an example.

In some examples, GUI customization tool 140 can be accessible only to users with administrator rights, such as with admin device 100. An admin user interacting with GUI customization tool 140 can create a template for GUI 164 that determines how GUI 164 appears on user devices 150.

FIG. 2 includes example steps for graphically providing an interface for customizing a GUI template. At stage 210, GUI customization tool 140 can provide customization options. For example, a user can initiate GUI customization tool 140 on admin device 100. The customization options can be GUI elements that change various settings in a template of GUI 164, such as colors, text, and images. Some example types of GUI elements can include text boxes, option buttons, dropdown lists, toggles, color selectors, image uploaders, and the like.

In some examples, the customization options can be mapped to multiple templates of GUI 164. For example, application 130 can be executed on multiple platforms, such as a desktop application, a web browser, and a mobile device. GUI 164 can be configured differently for each platform, and application 130 can include a template for each platform. Each customization option in GUI customization tool 140 can be mapped to part of each template corresponding to the platform. For example, all platforms can include a header, and a customization option can change the header text in all the templates according to their respective platform configuration. Some customization options may not be mapped to all templates. For example, web browser GUIs and desktop apps can be more complex and contain design components not found in a mobile device GUI due to size and usability constraints. GUI customization tool 140 can therefore include some customization options that affect one or some, but not all the templates. Examples of customization options in GUI customization tool 140 are described in further detail later herein regarding FIGS. 4-7.

In an example, GUI customization tool 140 can include an option to select a tenant, which can have a unique tenant ID. In one example, this can include logging into the GUI using the tenant ID or logging into a tenant-specific instance of the GUI. Alternatively, the administrative user can select between tenants using a selection option on the GUI. A tenant ID can be a set of numeric or alphanumeric characters associated with a tenant. A tenant can indicate a customer or a group within one or more organizations or enterprises. Users within a tenant can share common access rights to an instance of software. Selecting a tenant ID can allow an administrative user to create tenant specific GUI templates.

As an example, users within an organization can have a user profile for logging into application 130. The user profile can have a tenant ID associated with it. When a user logs into application 130, user device 150 can request display settings for GUI 164 from server 160. That request can include a tenant ID associated with the user's user profile. Database 170 can store multiple templates of GUI 164 for the organization. Each template can be associated with one or more tenant IDs. Server 160 can match the user profile's tenant ID to the corresponding GUI template and transmit that template of GUI 164 to user device 150.

At stage 220, GUI customization tool 140 can display multiple template previews in conjunction with the customization options. These can be simultaneously displayed on the same screen, allowing a user to quickly see previews for different platforms. A template preview can be a window that displays a template of GUI 164 according to changes made to the customization options. Each template preview can represent a different platform for GUI 164. In an example, GUI customization tool 140 can include three template previews: one for a web browser, one for a desktop application, and one for a mobile device. In an example, GUI customization tool 140 can display the template previews on the same page so that a user can view and compare template changes on all platforms simultaneously.

In some examples, the template previews can be shell of GUI 164 in that they illustrate the format of GUI 164 without displaying any actual content. For example, images can appear as an empty box of a certain color or shade pattern in the template, which can indicate to the user that an image will appear in that location. In another example, thick solid lines can indicate the presence of text content. This can be done for other components of GUI 164 as well. For components of GUI 164 that are displayed across all or most of the pages in GUI 164, such as a company logo, the template preview can include the actual image rather than a shell component. Examples of similarly used components can include a header, footer, and title.

At stage 230, GUI customization tool 140 can receive a selection of a customization option. Examples of a selection can include a click, a tap, and alphanumeric input. For example, a user can input alphanumeric text into a text field using a keyboard. In another example, a user can tap or click on a toggle or selectable customization option.

In some examples, receiving a selection of a customization option can include storing mapped changes associated with the selection in a local cache, such as a cache for a web browser. For example, GUI customization tool 140 can store the changes in the local cache as a data file, such as a JavaScript Object Notation ("JSON") or Cascading Style Sheets ("CSS") file. The changes may only affect the template previews while stored in the local cache. For example, other user devices 150 running GUI 164 retrieve settings database 170 and therefore would therefore not be affected by changes made in GUI customization tool 140. GUI customization tool 140 can include a feature that allows a user to save the changes to database 170, at which point admin device 100 can send the changes, or data file, to database 170 (or to server 160, which would in turn process the updates to database 170). The changes can then appear in instances of GUI 164 loaded by user devices 150.

In an example, GUI customization tool 140 can include an entry for incorporating customizations into templates. If there is no customization, an example entry can read:

{"customized":false}

If there are customizations, the example customized entry can include:

{"customized":true}

This entry can be accompanied by language for the custom settings. Below is an example entry where a user customizes GUI 164:

{"navigationBar":
{"backgroundColor":"#261d1d", "typeAndIconColor": "#000 000"}, "body":
{"interactiveColor":"#6eb3cf", "backgroundColor": "#663 b3b", "defaultBodyB
randing":true, "typeAndIconColor":"#000000"}, "tabBar":
{"useNavigationBarTypeAndIconColor":false, "useNavigat ionBarTypeAndIconC
olorForDesktop":false, "typeAndIconColor": "#000000"}, "browserTabBar":
{"companyName": "VMware", "productName":"Intelligent Hub"}, "customized":true}

In some examples, GUI 164 can include similar entries. This can allow GUI 164 to be updated without changing any of its coding. A configuration file can be uploaded to database 170, and GUI 164 can be configured to check for such a data file for additional settings.

At stage 240, GUI customization tool 140 can update the template previews based on the customization option selection. In an example, GUI customization tool 140 can update the template previews in real-time. This may allow a user to immediately view how the changes affect GUI 164 on all platforms, which in turn can expedite the template customization process. In one example, a user can upload a logo image to GUI customization tool 140. Once uploaded, GUI customization tool 140 can display the logo in each template preview where it would appear in GUI 164 once the template is live. In another example, a user can toggle text color between black and white to determine which would be easier to read based on the background color.

FIG. 3A is an example flow chart with stages for GUI customization tool 140 for GUI 164. At stage 302, admin device 100 can initiate GUI customization tool 140. This can be done by an admin user loading an application or navigating to a URL specific to GUI customization tool 140, for example. In an example, the admin user can provide log-in credentials specific to an administrator profile. GUI customization tool 140 can be a standalone application or part of another application, such as application 130.

At stage 304, admin device 100 can display customization options and display template previews. The customization options can include GUI elements mapped to various components the template previews. The template previews can depict GUI 164 in various formats, including, for example, a web browser, a desktop application, and a mobile device. GUI customization tool 140 can display previews for multiple platforms simultaneously and in conjunction with the customization options. The template previews can depict a shell of GUI 164 for each platform. For example, the template previews can include basic components like colors and universal images in the template but exclude actual content. This can allow a user to view the design layout of the GUI template as customized.

At stage 306, admin device 100 can receive a selection of a customization option. A selection can be an indication of user input. For example, a user can interact with the customization options using various input methods, such as a tap, a click, or typing text. The customization option can indicate a desired change to the GUI template. As an example, a user can select a color in a customization option associated with the background color of GUI 164, indicating a desire to change the background color of GUI 164.

At stage 308, admin device 100 can save the selection to a cache. The cache can be a local storage medium, such as a web browser cache. In an example, admin device 100 can save the selection as a configuration file, such as a JSON or CSS file. Such a configuration file can be updated with each selection made. For example, initiating GUI customization tool 140 can cause admin device 100 to load a configuration file into a cache. Admin device 100 can update the configuration file each time a user makes a selection from one of the customization options.

At stage 310, admin device 100 can update the template previews. The update can be based on the selection made in stage 306. In an example, admin device 100 can update the template previews based on changes made to the configuration file in stage 308. For example, GUI customization tool 140 can be a web-based application that uses HyperText Markup Language ("HTML"). The HTML can include an HTML element that instructs a web browser to check the web browser cache for the configuration file. If there is no configuration file in the cache, or the file contains no updates, then the web browser can display the template previews using default settings or settings previously saved to a database. If there is a configuration file with updated settings, then the web browser can update the template previews according to those settings.

In an example, admin device 100 can update the template previews in real-time. For example, if a user chooses a new background color, then admin device 100 can immediately change the background color in all the template previews. This can allow a user to immediately view how the new background color looks in GUI 164 on all platforms. The user is not required to refresh the web page or navigate to another page to view the changes.

At stage 312, admin device 100 can repeat stages 306, 308, and 310 each time a customization option is selected or changed. For example, after a user elects to change the background color, the user may also want to change the text from black to white, or vice versa. This may be necessary, for example, after changing a background color from a light color to a dark color, or vice versa. Such a change could affect the color contrast between the background and text, which could make the text difficult to read. Each time a new selection to a customization option is made, admin device 100 can save the update to a cache and update the previews.

At stage 314, admin device 100 can receive a selection to save the template. For example, GUI customization tool 140 can include a "Save" button that allows a user to save the settings created by the customization option selections. In an example, GUI customization tool 140 can also include a "Reset" button that erases the settings saved to the cache and restores the template previews to their previous default.

At stage 316, receiving a save selection can cause admin device 100 to send the saved settings to a database that stores the settings for GUI 164, such as database 170 from FIG. 1. Once the settings are saved to the database, the changes can be applied to user devices 150 that display GUI 164. For example, user devices 150 can be configured to retrieve display settings from database 170 when loading GUI 164.

FIG. 3B is an example sequence diagram with stages for GUI customization tool 140 that includes a tenant ID option. At stage 320, admin device 100 can initiate GUI customization tool 140. This can be done by an admin user loading an application or navigating to a URL specific to GUI customization tool 140, for example. In an example, the admin user can provide log-in credentials specific to an administrator profile. GUI customization tool 140 can be standalone application or part of another application, such as application 130.

At stage 322, admin device 100 can receive a tenant ID. For example, GUI customization tool 140 can include a customization option that allows a user to select or input a tenant ID. Selecting a tenant ID can cause GUI customization tool 140 to create a template of GUI 164 specific to the tenant ID. Any further changes to customization options may not change GUI 164 for users not associated with the tenant ID. In some examples that do not include a tenant ID option, changes made in GUI customization tool 140 can change GUI 164 for all users in the organization.

At stage 324, admin device 100 can receive customization option selections and save the template. A selection can be an indication of user input. For example, a user can interact with the customization options using various input methods, such as a tap, a click, or typing text. The customization option can indicate a desired change to the template previews. As an example, a user can select a color in a customization option associated with the background color of GUI 164, indicating a desire to change the background color of GUI 164.

Customization option selections can be saved in a local cache, such as a web browser cache, until the user saves the changes. The cache can be a local storage medium, such as a web browser cache. In an example, admin device 100 can save the selection as a configuration file, such as a JSON or CSS file. Such a configuration file can be updated with each selection made. For example, initiating GUI customization tool 140 can cause admin device 100 to load a configuration file into a cache. Admin device 100 can update the configuration file each time a user makes a selection from one of the customization options. In an example, the tenant ID received in stage 322 can be included in the configuration file.

Receiving customization option selections can include updating template previews that are displayed in conjunction with the customization options. The updating can be based on the customization option selections. In an example, admin device 100 can update the template previews based on changes made to the configuration file described above. For example, GUI customization tool 140 can be a web-based application that uses HyperText Markup Language ("HTML"). The HTML can include an HTML element that instructs a web browser to check the web browser cache for the configuration file. If there is no configuration file in the cache, or the file contains no updates, then the web browser can display the template previews using default settings or settings previously saved to a database. If there is a configuration file with updated settings, then the web browser can update the template previews according to those settings.

In an example, admin device 100 can update the template previews in real time. For example, if a user chooses a new background color, then admin device 100 can immediately change the background color in all the template previews. This can allow a user to immediately view how the new background color looks in GUI 164 on all platforms. The user is not required to refresh the web page or navigate to another page to view the changes.

Once the user saves the template, at stage 326, admin device 100 can send the template settings, and the tenant ID, to server 160. For example, admin device 100 can send the configuration file described in stage 324. At stage 328, server 160 can update the settings of GUI 164. Server 160 can save the updated settings in database 170, for example. In an example, database 170 can store settings for multiple versions of GUI 140, and each version can be associated with a different tenant ID. Server 160 can update the settings of the version of GUI 164 associated with the tenant ID. If no version of GUI 164 exists for the tenant ID, then server 160 can create a new version for the tenant ID.

In an example, GUI 164 can include an entry retrieving customized template settings. If there is no customization, an example entry can read:

{"customized":false}

If there are customizations, the example customized entry can include:

{"customized":true}

Such an entry can indicate that additional settings should be retrieved from a configuration file. Each version of GUI 164 can a configuration file associated with a tenant ID. The customized file can include an example entry such as:

{"tenantID":68435A}

In this example, "68435A" is the tenant ID provided by the admin user when creating the template.

At stage 330, user device 150 can send log-in credentials to server 160 for application 130. In an example, the log-in credentials can include a user ID that has an associated tenant ID. At stage 332, server 160 can verify the log-in credentials and gather GUI template settings. The GUI template settings gathered by server 160 can depend on the tenant ID associated with the user ID. For example, the user ID can map to a tenant ID, which in turn can map to a tenant-specific version of GUI 164. Continuing the example above, a user can provide log-in credentials with a user ID associated with tenant ID 68435A. After verifying the log-in credentials, server 160 can retrieve general settings for GUI 164 as well as the settings from a configuration file associated with tenant ID 68435A.

At stage 334, server 160 can send the GUI settings associated with the tenant ID to user device 150. Continuing the previous example, this can include sending the general settings for GUI 164 as well as the configuration settings for tenant ID 68435A. The configuration settings for tenant ID 68435A can be sent as a separate configuration file, as an example. User device 150 can load GUI 164 according to the settings provided by server 160. In an example, user device 150 can store settings for GUI 164 in a local cache. User device 150 can be configured to periodically check with server 160 to determine if any settings for GUI 164 have changed. For example, an admin user may change settings to GUI 164 using GUI customization tool 140 while a user is interacting with GUI 164. If settings have changed, then server 160 can send those settings to user device 150, which can then be changed in the instance of GUI 164 displayed on user device 150.

FIGS. 4A-C are an illustration of an exemplary GUI 400 for GUI customization tool 140. In this example, FIGS. 4A-C represent the top, middle, and bottom respectively of a single page of GUI 400, such that multiple platform previews 402, 404, 406 are simultaneously shown on a single screen. The terms "page" and "screen" are used interchangeably and are not meant to be limiting to a particular display type. GUI 400 includes a variety of customization option types. A "field" customization option receives alphanumeric text, an "image loader" customization option uploads an image, a "color selector" customization option allows a user to select a color, an "option button" customization option allows a user to choose one from a set of options, a "toggle button" option allows a user to toggle a feature on or off, and an "action button" allow a user to cause a certain action to occur. In GUI 400, customization options are grouped into sections on the left side according to the component of GUI 400 that they modify. Template previews are displayed next to the customization options on the right side of GUI 400. The template previews can include web browser preview 402, desktop preview 404, and mobile preview 406. GUI customization tool 140 can update the template previews as changes are made to the customization options.

As shown in FIG. 4A, GUI 400 includes "Web Browser" section 410 and "Logos" section 420. Web Browser 410 section includes "Organization Name" field 412 and "Product Name" field 414 that map to the title page in a web browser. For example, FIG. 4A includes the text "VMware" in Organization Name field 412 and "Intelligent Hub" in Product Name field 414. Accordingly, web page title component 416 includes the text: "VMware: Intelligent Hub." Because Organization Name field 412 or Product Name field 414 are specific to a web browser, desktop preview 404 and mobile preview 406 remain unchanged. If a user changes the text of Organization Name field 412 or Product Name field 414, the text displayed in web page title component 416 can be updated as the changes are made.

Logos section 420 includes "Company Logo" image uploader 422 and "Favicon" image uploader 424. Company Logo image uploader 422 can map to company logo component 426. As shown in FIGS. 4A-C, both web browser preview 402 and desktop preview 404 include company logo component 426, but mobile preview 406 does not. Uploading an image to Company Logo image uploader 422 can therefore cause the uploaded image to appear in just web browser preview 402 and desktop preview 404. Favicon image uploader 424 can map to favicon component 428 of web browser preview 402.

As shown in FIG. 4B, GUI 400 includes "Navigation Bar" section 430. Navigation bar section 430 includes "Background Color" selector 432 and "Type & Icon Color" option selector 434. Background Color selector tool 432 can map to navigation bar background component 436 and can allow a user to choose from a large selection of colors. Color selector tools are described in more detail later herein regarding FIG. 5. Type & Icon Color option selector 434 can allow a user to choose between black and white colors for text components 438 of the navigation bar. As shown in FIGS. 4A-C, all three template previews include navigation bar background component 436 and text components 438. Changing Background Color selector 432 or Type & Icon Color option selector 434 can cause their associated components in all three template previews to change accordingly as the changes are made.

GUI 400 also includes "Body/Content" section 440. Body/Content section 440 includes "Interactive Color" selector 442 and "Advanced Content Branding" toggle 444. Advanced Content Branding toggle can make additional options available, like "Background Color" selector tool 446 and "Type & Icon Color" option selector 448. Interactive Color selector 442 can map to interactive components 452, Background Color selector 446 can map to background region 454, and Type & Icon Color option selector 448 can map to text 456 in the body/content of the template previews.

As shown in FIG. 4C, GUI 400 includes "Tab Bar (Desktop/Mobile)" section 460. Tab Bar (Desktop/Mobile) section 460 includes two "Type & Icon Color" option selectors: desktop option selector 462 and mobile option selector 464. Desktop option selector 462 and mobile option selector 464 can include options to use default settings or to copy the settings from Navigation Bar section 430. Desktop option selector 462 can map to desktop tab bar component 466, and mobile option selector 464 can map to mobile tab bar component 468. Changes to desktop option selector affect only desktop preview 404, and changes to mobile option selector 464 affect only mobile preview 406.

GUI 400 also includes "Save" action button 472 and "Reset" action button 474. In an example, save action button 472 can save changes made in GUI customization tool 140 to GUI 164. For example, as a user makes changes to the customization options, those changes can be saved as a data file in a cache, such as a web browser cache. When a user selects Save action button 472, the GUI customization tool 140 can send the changes to GUI customization engine 166, which in turn saves the changes as part of GUI 164. GUI customization engine 166 can save the changes in database 170, as an example. GUI 164 can then reflect the saved changes on user device 150. Reset action button 474 can undo all unsaved changes made in GUI customization tool 140.

FIG. 5 illustrates an example of a color selector tool, such as Background Color selector tool 432 or Interactive Color selector tool 442 from FIGS. 4A and 4B. A color selector customization option can include color field 510 and color button 520. Color field 510 can be configured to map alphanumeric text to an associated color hex code. For example, a user can enter a color hex code into color field 510 to have that color mapped to the associated components in the template previews. Color field 510 can also display the color hex code of a color selected using color selection tool 530. That hex code can be copied into other color selector customization options to ensure color consistency in the template.

Color selection tool button 520 can open color selection tool 530. Color selection tool 530 can include multiple tools for selecting a color. For example, color selection tool 530 can include base color element 540, shade element 550, opacity element 560, and color hex code element 570. In an example, base color element 540 can display a range of available base colors in a spectrum that a user can select from. Shade element 550 can display shades of the color selected in base color element 540. In an example, the color hex code of the selected portion of shade element 550 can be displayed in color hex code element 570. Opacity element 560 can allow a user to select the opacity of the color.

FIGS. 6A-C illustrate examples of how various customization options from FIG. 4 change a mobile template preview, such as mobile preview 406 from FIG. 4. For example, body/content text 456 as shown in FIG. 6A is black, indicating that Type & Icon Color option selector 448 is set to "black." When Type & Icon Color option selector 448 is set to "white," body/content text 456 displays in white as well, as is illustrated in FIGS. 6B and 6C. FIGS. 6A and 6B illustrate where mobile option selector 464 is set to "Use Default branding." As shown in FIGS. 6A and 6B, navigation bar background component 436 and mobile tab bar component 468 have different background colors/shades. Selecting "Same as Navigation Bar" for mobile option selector 464 causes mobile tab bar component 468 to change to have the same background color as navigation bar background component 436, as is shown in FIG. 6C.

FIGS. 7A and 7B illustrate examples of how the customization options described above regarding FIGS. 6A-C effect changes in a desktop template preview, such as desktop preview 404. FIG. 7A illustrates a desktop template preview where Type & Icon Color option selector 448 is set to "black," which causes body/content text 456 to be displayed in black. FIG. 7B illustrates a desktop template preview where Type & Icon Color option selector 448 is set to "white," which causes body/content text 456 to be displayed in white. FIGS. 7A and 7B also illustrate where mobile option selector 464 is changed from "Use Default branding" to "Same as Navigation Bar" as in FIGS. 6A-C. As shown in FIGS. 7A and 7B, the change to mobile option selector 464 does not affect the desktop template preview.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for graphical user interface ("GUI") template customization, comprising:
   receiving a selection of one of a plurality of tenants in a GUI customization tool;
   providing customization options in the GUI customization tool, wherein each of the customization options corresponds to a component of a template for a GUI specific to the selected tenant;
   simultaneously displaying a plurality of previews of the GUI template in conjunction with the customization options, wherein each of the plurality of previews displays a different platform configuration of the GUI, and wherein a GUI component is included in each of the different platform configurations and is displayed in each of the plurality of previews;
   receiving a first selection of one of the customization options, the selected customization option being mapped to the GUI component in a first platform configuration and not to the GUI component in a second platform configuration, the first platform configuration corresponding to a first preview of the plurality of previews, and the second platform configuration corresponding to a second preview of the plurality of previews;
   while simultaneously displaying the plurality of previews, including the first and second previews, updating, based on the selection, the GUI component in the first preview and not in the second preview;
   receiving a second selection for saving changes made to the GUI template; and
   in response to the second selection, modifying a first configuration file corresponding to the first platform configuration, wherein modifying the configuration file includes changing a setting of the GUI component based on the first selection, wherein a second configuration file corresponding to the second platform configurations is not modified to change the setting of the GUI component based on the first selection.

2. The method of claim 1, wherein the first preview is updated in real-time in response to the selection.

3. The method of claim 1, wherein the simultaneously displayed platform configurations are for at least one of a web page, a mobile device, and a desktop application.

4. The method of claim 1, wherein updating the first preview includes applying navigation bar settings to a first tab bar in the first preview and not applying the navigation bar settings to a second tab bar in the second preview.

5. The method of claim 1, further comprising:
   storing the selected customization options in a cache;
   receiving a selection to save the template; and
   transmitting the selected customization options to a storage device.

6. The method of claim 5, wherein transmitting the selected customization options to a storage device causes the GUI template to be updated according to the selected customization options.

7. The method of claim 1, wherein the plurality of previews simultaneously display the different display platforms according to a saved template for the tenant.

8. A non-transitory, computer-readable medium containing instructions that, when executed by a hardware-based processor, performs stages for graphical user interface ("GUI") template customization, the stages comprising:
   receiving a selection of one of a plurality of tenants in a GUI customization tool;
   providing customization options in the GUI customization tool, wherein each of the customization options corresponds to a component of a template for a GUI specific to the selected tenant;
   simultaneously displaying a plurality of previews of the GUI template in conjunction with the customization options, wherein each of the plurality of previews displays a different platform configuration of the GUI, and wherein a GUI component is included in each of the different platform configurations and is displayed in each of the plurality of previews;
   receiving a first selection of one of the customization options, the selected customization option being mapped to the GUI component in a first platform configuration and not to the GUI component in a second platform configuration, the first platform configuration corresponding to a first preview of the plurality of previews, and the second platform configuration corresponding to a second preview of the plurality of previews;
   while simultaneously displaying the plurality of previews, including the first and second previews, updating, based on the selection, the GUI component in the first preview and not in the second preview;
   receiving a second selection for saving changes made to the GUI template; and
   in response to the second selection, modifying a first configuration file corresponding to the first platform configuration, wherein modifying the configuration file includes changing a setting of the GUI component based on the first selection, wherein a second configuration file corresponding to the second platform configurations is not modified to change the setting of the GUI component based on the first selection.

9. The non-transitory, computer-readable medium of claim 8, wherein the first preview is updated in real-time in response to the selection.

10. The non-transitory, computer-readable medium of claim 8, wherein the simultaneously displayed platform configurations are for at least one of a web page, a mobile device, and a desktop application.

11. The non-transitory, computer-readable medium of claim 8, wherein updating the first preview includes applying navigation bar settings to a first tab bar in the first preview and not applying the navigation bar settings to a second tab bar in the second preview.

12. The non-transitory, computer-readable medium of claim 8, the stages further comprising:
   storing the selected customization options in a cache;
   receiving a selection to save the template; and
   transmitting the selected customization options to a storage device.

13. The non-transitory, computer-readable medium of claim 8, wherein transmitting the selected customization options to a storage device causes the GUI template to be updated according to the selected customization options.

14. The non-transitory, computer-readable medium of claim 8, wherein the plurality of previews simultaneously display the different display platforms according to a saved template for the tenant.

15. A system for graphical user interface ("GUI") template customization, comprising:
   a memory storage including a non-transitory, computer-readable medium comprising instructions; and a computing device including a hardware-based processor that executes the instructions to carry out stages comprising:

receiving a selection of one of a plurality of tenants in a GUI customization tool;

providing customization options in the GUI customization tool, wherein each of the customization options corresponds to a component of a template for a GUI specific to the selected tenant;

simultaneously displaying a plurality of previews of the GUI template in conjunction with the customization options, wherein each of the plurality of previews displays a different platform configuration of the GUI, and wherein a GUI component is included in each of the different platform configurations and is displayed in each of the plurality of previews;

receiving a first selection of one of the customization options, the selected customization option being mapped to the GUI component in a first platform configuration and not to the GUI component in a second platform configuration, the first platform configuration corresponding to a first preview of the plurality of previews, and the second platform configuration corresponding to a second preview of the plurality of previews;

while simultaneously displaying the plurality of previews, including the first and second previews, updating, based on the selection, the GUI component in the first preview and not in the second preview;

receiving a second selection for saving changes made to the GUI template; and in response to the second selection, modifying a first configuration file corresponding to the first platform configuration, wherein modifying the configuration file includes changing a setting of the GUI component based on the first selection, wherein a second configuration file corresponding to the second platform configurations is not modified to change the setting of the GUI component based on the first selection.

16. The system of claim 15, wherein the first preview is updated in real-time in response to the selection.

17. The system of claim 15, wherein the simultaneously displayed platform configurations are for at least one of a web page, a mobile device, and a desktop application.

18. The system of claim 15, wherein updating the first preview includes applying navigation bar settings to a first tab bar in the first preview and not applying the navigation bar settings to a second tab bar in the second preview.

19. The system of claim 15, the stages further comprising:
storing the selected customization options in a cache;
receiving a selection to save the template; and
transmitting the selected customization options to a storage device.

20. The system of claim 19, wherein transmitting the selected customization options to a storage device causes the GUI template to be updated according to the selected customization options.

* * * * *